US006047862A

United States Patent [19]

Davies

[11] Patent Number: 6,047,862

[45] Date of Patent: Apr. 11, 2000

[54] DISPENSER FOR DISPENSING VISCOUS FLUIDS

[75] Inventor: David Eifion Davies, Wokingham, United Kingdom

[73] Assignee: SmithKline Beecham p.l.c., Brentford, United Kingdom

[21] Appl. No.: 08/945,371

[22] PCT Filed: Mar. 21, 1996

[86] PCT No.: PCT/EP96/01558

§ 371 Date: Jan. 28, 1998

§ 102(e) Date: Jan. 28, 1998

[87] PCT Pub. No.: WO96/32343

PCT Pub. Date: Oct. 17, 1996

[30] Foreign Application Priority Data

Apr. 12, 1995 [GB] United Kingdom .................. 9507572

[51] Int. Cl.[7] .............................. B67D 5/60; G01F 11/00

[52] U.S. Cl. ....................... 222/145.3; 222/256; 222/327; 222/380

[58] Field of Search .................................. 222/94, 145.3, 222/136, 380, 256, 327, 402.12, 325, 326, 321.1, 321.7, 321.9, 386

[56] References Cited

U.S. PATENT DOCUMENTS

| | | | |
|---|---|---|---|
| 4,434,917 | 3/1984 | Saito et al. | 222/383 |
| 4,715,518 | 12/1987 | Moore | 222/257 |
| 4,747,517 | 5/1988 | Hart | 222/137 |
| 4,789,012 | 12/1988 | Hart | 141/18 |
| 4,804,115 | 2/1989 | Ball | 222/209 |
| 4,907,726 | 3/1990 | Harris | 222/145 |
| 4,936,493 | 6/1990 | Foster et al. | 222/209 |
| 4,991,744 | 2/1991 | Von Schuckmann | 222/136 |
| 5,016,783 | 5/1991 | Hayes et al. | 222/321 |
| 5,104,009 | 4/1992 | Battegazzore | 222/209 |
| 5,289,949 | 3/1994 | Gentile | 222/137 |
| 5,553,747 | 9/1996 | Raba et al. | 222/94 |
| 5,823,387 | 10/1998 | Manadanas et al. | 222/92 |

*Primary Examiner*—Kevin Shaver
*Assistant Examiner*—Keats Quinalty
*Attorney, Agent, or Firm*—Nora Stein-Fernandez; Janice E. Williams; Charles M. Kinzig

[57] ABSTRACT

A pump dispenser suitable for striped toothpaste, comprising a pump head [1] and a replaceable reservoir [2] for the toothpaste, in which the toothpaste is packed in radially disposed segments, and the reservoir is locked against rotation relative to the pump head.

14 Claims, 3 Drawing Sheets

3/3

DISPENSER FOR DISPENSING VISCOUS FLUIDS

This invention relates to pump dispensers for viscous flowable fluid materials, in particular to dispensers for toothpaste which is contained in adjacent segments of differently coloured toothpaste material so as to produce toothpaste of a striped appearance on dispensing.

Toothpaste is commonly supplied in known pump dispensers which generally comprise a cylindrical tubular reservoir for a bulk of the toothpaste, having integrally made or attached at the upper end of the reservoir a pump head which includes a mechanical pump operable by hand action, and closed at the bottom end by a follower piston.

The pump commonly comprises a pump piston which is reciprocally slideably moveable in the axial direction of the cylindrical reservoir, the pump piston having an aperture passing through the pump piston, opening into the interior of the reservoir and communicating via a channel to a dispensing orifice at the end of a nozzle. In operation the pump piston is depressed by hand action on an actuating button or lever toward the reservoir and against the toothpaste therein so as to extrude toothpaste through the aperture in the piston, along the nozzle and out through the dispensing orifice. In such known dispensers the pump operating mechanism is generally resilient in action so that on release of the operating pressure the pump piston is returned to its original position. The dispenser is often fitted with a closure linked to the operation of the pump mechanism so that as the pressure is released and the pump piston is returned the closure closes the orifice.

The follower piston is also slideable within the reservoir and is provided with a one-way sliding mechanism such as a star washer, so that it can only move upwards within the reservoir. Consequently as the spring returns the pump piston the follower piston is drawn up the reservoir until when all of the toothpaste has been dispensed the follower piston is at an extreme upper position adjacent to the pump piston.

In such dispensers it is known to load toothpaste into the reservoir in a number of radially disposed differently coloured side-by-side segments, so that as the toothpaste is extruded it emerges form the orifice in a striped stream maintaining the side-by-side disposition of the segments in the stream. One such toothpaste is sold under the name Aquafresh™ and is loaded in side-by-side red, white and blue or red, white and green segments so as to be extruded in a stream with a correspondingly striped appearance. Aquafresh™ toothpaste has been sold in such pump dispensers for many years.

It is desirable to provide such pump dispensers with replaceable reservoirs, so that the complex pump mechanism does not have to be thrown away together with the empty reservoir when the toothpaste has all been dispensed, but a new full reservoir can simply be attached to the pump. This can be more environmentally acceptable in overcoming the problem of excess packaging, and reducing the need to dispose of complex and expensive pump parts when the dispenser is empty. WO 93/16932 discloses the theoretical concept of such a pump dispenser having a replaceable reservoir, for example in FIGS. 1–6 thereof.

The pump dispensers disclosed in WO 93/16932 having a replaceable reservoir are generally unsatisfactory for use with such segmentally contained striped toothpaste. The problem is that of aligning the toothpaste segments in the new full reservoir with any residue of toothpaste remaining in the pump, e.g. in the aperture and in the channel. Any misalignment can cause a disruption of the striped appearance of the extruded striped stream shortly after the new reservoir has been attached, i.e. when the interface between the new material in the reservoir and the old material in the pump reaches the outlet. Although this is of no hygienic significance it detracts from the otherwise attractive appearance of a consistent striped stream. It is an object of this invention to provide a pump dispenser which overcomes this problem.

According to this invention, a pump dispenser for a viscous flowable fluid material comprises:

a pump head, having at its lower end an attachment means for the fluid-tight replaceable attachment of a replaceable reservoir of the fluid material, the pump head having a mechanical hand-operable pump by means of which the material may be pumped from the reservoir to a dispensing orifice at the end of a nozzle;

a replaceable reservoir of the fluid material replaceably attached at the lower end of the pump head by means of the said attachment means.

characterized in that the reservoir can be attached to the pump head only in one or more pre-set orientations relative to the pump head and when thereby attached to the pump head the orientation of the reservoir is locked so that the reservoir cannot significantly rotate relative to the pump head.

By "significantly rotate" it is understood that the pump head may rotate or wobble relative to the reservoir to a small extent, but this small extent of rotation will not affect alignment of the toothpaste segments in the new full reservoir with any residue of toothpaste remaining in the pump, e.g. in the aperture and in the channel to the extent that it causes a significant disruption of the striped appearance of the extruded striped stream. The amount of rotation which may be allowed without deteriorating from the quality of the striped stream may be determined by experiment. Suitably the pump head is locked against rotation within 5°, preferably within 5°, preferably within 1°, ideally against any rotation, within manufacturing tolerances. Such locking against any rotation is quite feasible with present plastics molding tolerances.

The bottom end of the reservoir opposite the pump head may comprise a base, upon which the dispenser with the reservoir attached, or the reservoir alone, may be stood. Such a base may be essentially identical to the base of the known pumps described above. As used herein the terms "bottom", "top", "upper", "lower" and similar directionally related terms are defined relative to the position of such a base.

The pump head may include a pump of generally known type, and is preferably self-priming. Preferably the pump includes a reciprocally moveable pump piston having an aperture passing through the pump piston and opening into the interior of the pump head and communicating via a channel to a dispensing orifice at the end of a nozzle, which again may be of a generally known type. Such a pump may, when the reservoir is attached, operate in the known manner described above. Many suitable types of pumps are known, such as the known pump used for the marketed Aquafresh™ toothpaste, which may be used in the dispenser of this invention.

The replaceable reservoir is preferably of the same general shape and construction as known integral reservoirs, i.e. a generally cylindrical parallel sided tube having an internal one way slideably moveable follower piston, which initially is at the bottom end of the reservoir. Relative rotation of the pump head and the reservoir is likely to occur about the longitudinal axis of a cylindrical reservoir. The reciprocating movement of the pump piston is generally in the axial direction of the cylindrical reservoir.

The top end of the reservoir is open in a mouth, preferably over a substantial area of its cross section, to enable the fluid material therein to be in communication with the pump head when the reservoir is attached to the pump head, and to allow easy flow of a viscous material. Prior to attachment, e.g. as supplied as a refill for the dispenser, the top end of the reservoir may be closed by a removable closure such as a screw or friction fit cap or a tear off or puncturable membrane. e.g of foil etc. Alternatively the pump head may include means to open or remove such a closure, e.g. to puncture a thin sealing membrane, but such a puncturable membrane may be less suitable with toothpastes contained in segments as described above as remnants of the membrane may disrupt the stripes.

The attachment means may comprise a screw connection, a friction or snap fit connection, a bayonet connection etc. between the reservoir and the pump head. Other attachment means will be apparent to those skilled in the art.

In a preferred construction of the attachment means the lower end of the pump head comprises a skirt, and the upper end of the reservoir is a shaped end of shape and size which can mate smoothly with a fluid tight fit with the skirt in a male-female type cooperation when the reservoir and skirt are presented to each other in the longitudinal axis direction of the reservoir. The upper end of the reservoir may fit within the skirt. The skirt and the shaped end may be of cylindrical cross section.

Below this shaped end the outer surface of the wall of the reservoir may be screw threaded, and there may be a correspondingly screw threaded retaining collar around the skirt which may engage the screw thread on the reservoir so as to hold the reservoir and pump head together. The outer surface of the wall of the skirt may be provided with upper and lower abutment surfaces to prevent the retaining collar from becoming detached from the pump head, and against which the collar may grip when the collar is screwed tight to hold the reservoir against the pump head.

The shaped end and the skirt may include abutment surfaces to limit the distance the shaped end fits into the skirt and to provide a fluid tight seal. For example the inner cross section of the skirt may narrow to form a ledge surface at a distance above its lower edge so that the shaped end of the reservoir abuts against this ledge.

To allow the reservoir to be attached to the pump head only in one or more pre-set orientations relative to the pump head and to lock the reservoir when in place so that it cannot significantly rotate relative to the pump head, the attachment means may include respective abutment parts on the pump head and reservoir which abut and prevent attachment other than when the reservoir and pump head are presented to each other in a pre-set orientation, for example which can only interlock or engage in a pre-set orientation, and when attached the abutment prevents relative rotation.

In the preferred construction described above the skirt may have one or more concavities, e.g. cut-outs such as notches extending upwardly from its lower edge, and the shaped part of the reservoir which fits into the skirt may have one or more correspondingly positioned, suitably correspondingly shaped and sized, convexities or projections which engage with the concavities. By such a construction in the preferred construction the shaped end of the reservoir can only be properly fitted into the skirt when the one or more convexities and concavities are in mating alignment, and their engagement prevents any significant relative rotation when the two are attached together. Suitably the pump head and reservoir may include one or more, e.g. two sets of such mating concavities and convexities.

In an alternative but related construction of the attachment means the upper end of the reservoir comprises a skirt, the lower end of the pump head is a shaped end of shape and size which can mate smoothly with a fluid tight fit with the skirt in a male-female type cooperation when the reservoir and skirt are presented to each other in the longitudinal axis direction of the reservoir. The upper end of the reservoir may fit around the shaped end. The skirt and the shaped end may be of cylindrical cross section.

At or below this skirt in this alternative embodiment the outer surface of the wall of the reservoir may be screw threaded, and there may be a correspondingly screw threaded retaining collar around the shaped end of the pump head which may engage the screw thread on the reservoir, i.e. at or below the skirt, so as to hold the reservoir and pump head together. The outer surface of the wall of the shaped end may be provided with upper and lower abutment surfaces to prevent the retaining collar from becoming detached from the pump head, and against which the collar may grip when the collar is screwed tight to hold the reservoir against the pump head.

The shaped end and the skirt may include abutment surfaces as described above. Also as described above the skirt may have one or more concavities, e.g. cut-outs such as notches extending downwardly from its upper edge, and the shaped part of the reservoir which fits into the skirt may have one or more correspondingly positioned, suitably correspondingly shaped and sized, convexities or projections which engage with the concavities.

Alternatively the parts of the reservoir and the pump head which attach together, e.g. the skirts and shaped ends, may be shaped in a way that only allows attachment together in one or more pre-set orientations and which prevents rotation when attached, for example the parts may have a substantially circular section but with one or more flats or other deviation from circular at one or more places, or of distorted circular, or polygonal section, at the place where they attach together for example in a male-fernale type cooperation.

The dispenser may be provided with a closure for the dispensing orifice, and a cover cap for the pump head, of generally conventional construction.

The invention also provides a pump head as described above which can be attached to a replaceable reservoir of a fluid material as described above to form a dispenser as described above.

The invention also provides a replaceable reservoir as described above for a fluid material which can be attached to a pump head as described above to form a dispenser as described above.

The dispenser of this invention is particularly suited to the dispensing of toothpaste which is contained in the reservoir in a number of radially disposed differently coloured side-by-side segments, so that as the toothpaste is extruded it emerges from the orifice in a striped stream, ideally maintaining the side-by-side disposition of the segments in the stream, as the locking of the reservoir and pump head together prevents disruption of the stripes on the extruded toothpaste as the new toothpaste in the reservoir merges with residual toothpaste in the pump head and/or the aperture or channel. As mentioned above such toothpastes are well known, for example the known Aquafresh™ toothpaste which is disposed in red, white and blue or green radially disposed segments in a cylindrical reservoir to extrude in a correspondingly striped stream.

The invention therefore also provides a dispenser as described above wherein the reservoir contains a toothpaste which is loaded into the reservoir in a number of radially disposed differently coloured side-by-side segments.

The invention therefore also provides a replaceable reservoir for a dispenser as described above which contains a toothpaste which is loaded into the reservoir in a number of radially disposed differently coloured side-by-side segments.

In a generally cylindrical tubular reservoir the radially disposed segments are normally disposed around the centre defined by the longitudinal axis of the cylinder. Generally the disposition of the segments has a mirror plane of symmetry along this axis, so the reservoir may be attached to the pump head in two orientations 180° rotationally separated without disruption of the stripes, and therefore two sets of the above described concavities and convexities may be used. Methods and machinery for loading toothpaste into such a reservoir in such radially disposed segments are well known in the art, and known methods should be adapted that the reservoir is loaded with the segments in a fixed orientation relative to the reservoir. For example the reservoir may include alignment means which cause a filling machine to load such toothpaste into the reservoirs in a fixed orientation. Such an alignment means may for example comprise an abutment projection, or a concavity, in the base of the reservoir, which can engage with respectively a concavity or a projection on a filling machine.

The dispenser of the invention may be made of materials entirely conventional in the art of such dispensers, e.g. of moldable plastics materials, with optionally a metal spring to provide resilience in the pump mechanism.

The invention will now be described by way of non-limiting example only, with reference to the accompanying Figures.

Figure 6:
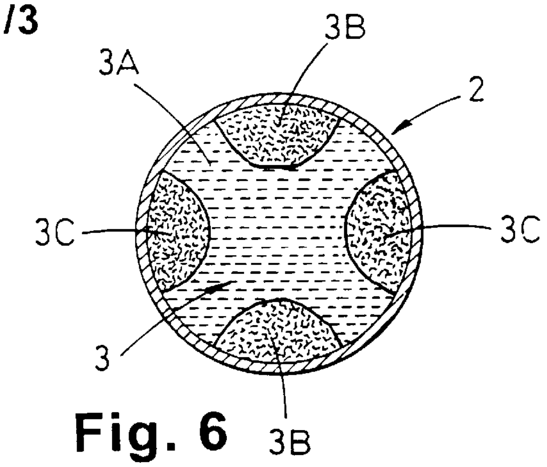
FIG. 6 shows a cross section through the reservoir of the dispenser of FIGS. 1 to 5 about the line B–B.

Referring to these figures, a dispenser for striped toothpaste comprises a pump head 1 (generally) and a replaceable reservoir 2 (generally). The reservoir 2 is cylindrical, and within the reservoir 2 toothpaste 3 (not shown in FIGS. 1 to 5) is disposed in a number of radially disposed differently colored side-by side segments as shown in FIG. 6, having 180° symmetry. Segments 3A are of white toothpaste material, segments 3B are of blue toothpaste material and segments 3C are of red toothpaste material.

The pump head 1 contains a hand operable pump which comprises a pump piston 4 which is reciprocally slideably moveable in the direction of the longitudinal axis of the reservoir 2 within pump head 1 under the action of operating button 5. The pump piston 4 has an aperture 6 at its center, communicating with the interior of the pump head 1, and via channel 7 with dispensing orifice 8. The orifice 8 is closed by a closure 9 which is linked to the operation of the button 5 and piston 4 to open when the button 5 is depressed. The pump includes a resilient spring 10. The entire pump head is covered by a removable cover 11.

Figure 1:
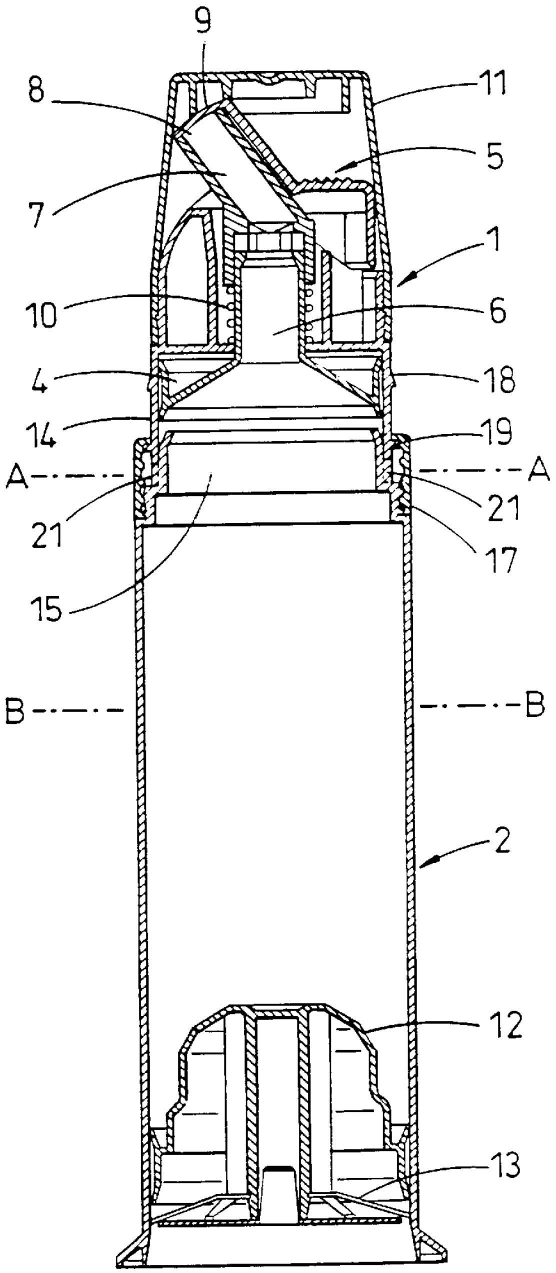
FIGS. 1 and 2 show longitudinal sections through a dispenser of this invention.
Figure 2:
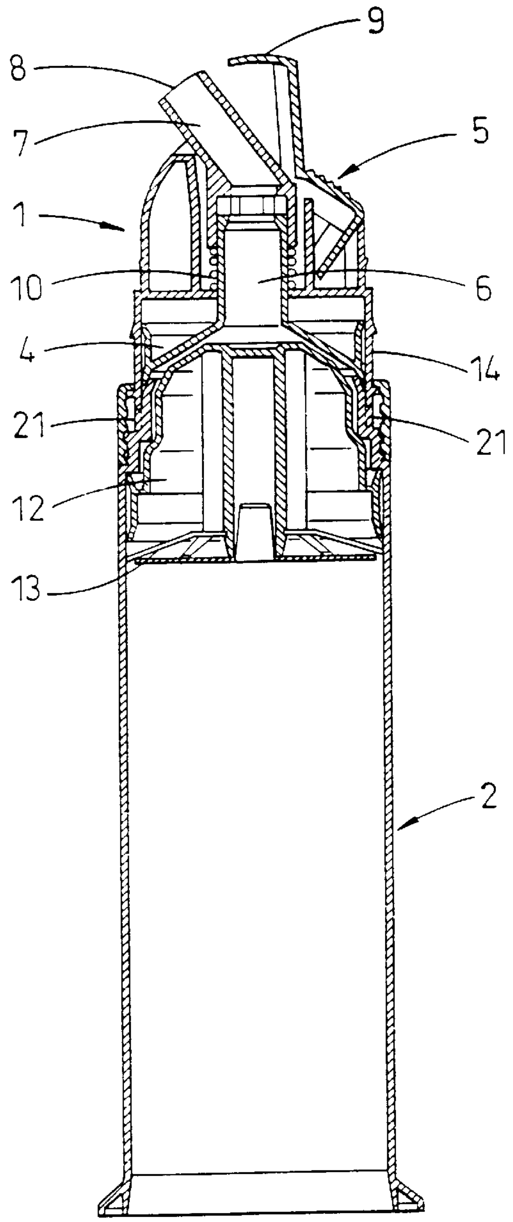
Figure 3:
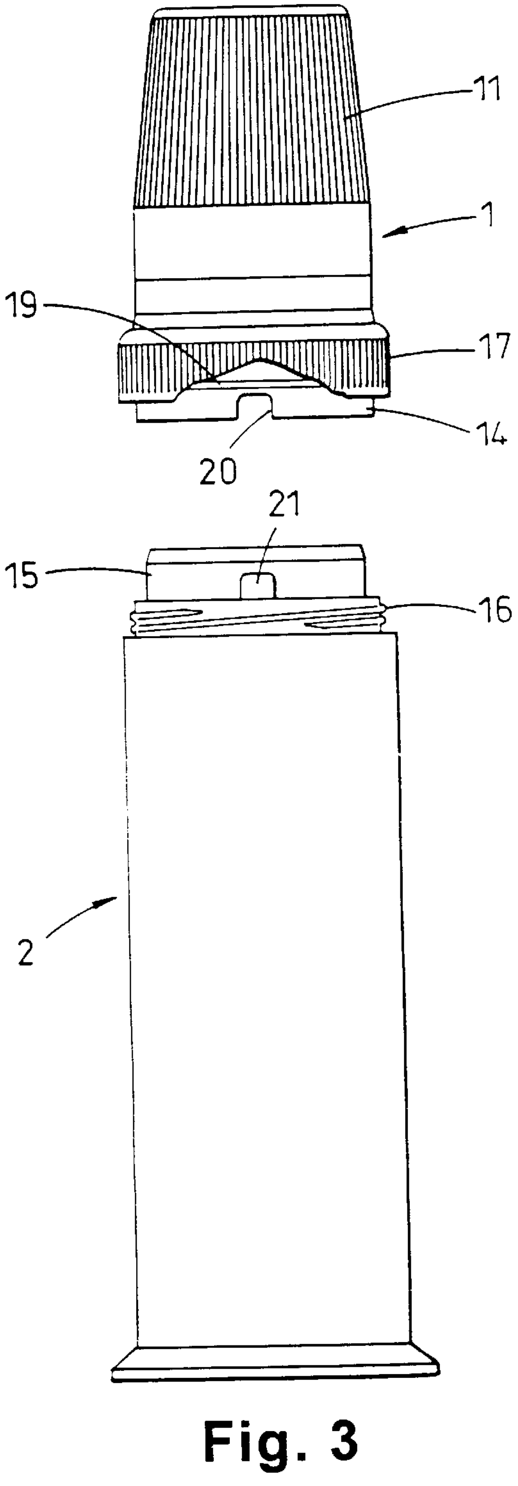
FIGS. 3 and 4 show views of a pump head and reservoir of the dispenser of FIGS. 1 and 2.
Figure 4:
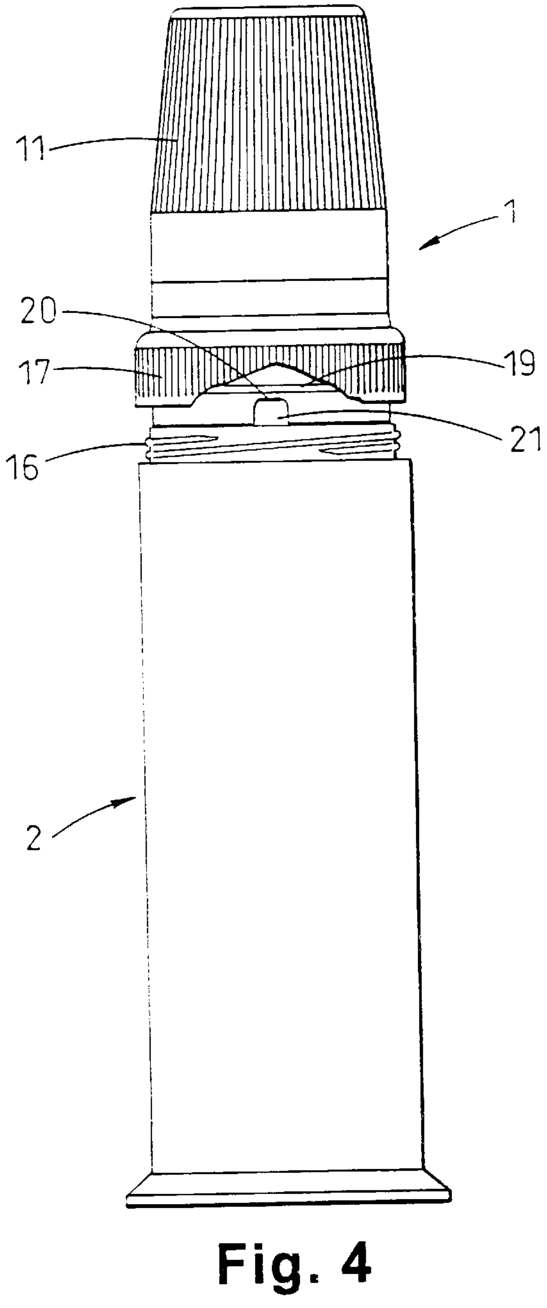
Figure 5:
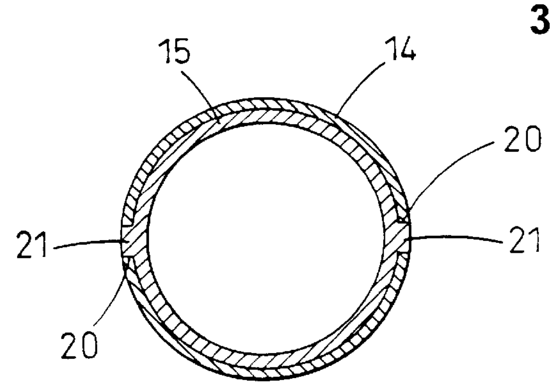
FIG. 5 shows a cross section of the dispenser of FIGS. 1 and 2 about the line A—A.

The operation of the pump is shown in FIGS. 1 and 2. The dispenser is initially in the configuration shown in FIG. 1. Application of hand pressure to the button 5 opens the closure 9 and depresses the pump piston 4 against toothpaste in the pump head, and extrudes toothpaste out through the aperture 6, channel 7 and orifice 8 in a striped stream (not shown). At the extremity of depression the pump is in the configuration shown in FIG. 2, and on release of pressure the spring 10 returns the pump to the configuration shown in FIG. 1.

At the lower end of the reservoir 2 is a follower piston 12 (generally), which is slideably moveable in the reservoir 2. The follower piston 12 includes a star washer 13 which allows the follower piston 12 only to move upwards towards the pump head. As toothpaste is dispensed from the reservoir 2, the follower piston 12 ascends the reservoir, until its top face contacts the lower face of the pump piston 4, the respective faces having correspondingly mating shapes so that as much toothpaste as possible is expelled from the dispenser, with no dead space between the top of the follower piston 12 and the bottom of the pump piston 4. This thereby leaves only a small plug of residual toothpaste in the channel 7.

The construction and operation of the above described elements 1–13 is entirely conventional, similar to known pump dispensers as used with Aquafresh™ toothpaste, and is therefore not described in detail.

The lower end of the pump head 1 is formed into a skirt 14. The upper end 15 of the reservoir 2 is shaped into a shaped end of a shape and size which can fit smoothly in a male-female toothpaste-tight fit into the skirt 14. Below the shaped upper end 15 the outer surface of the reservoir 2 is externally screw threaded at 16. Around the skirt 14 is a retaining collar 17 (shown part cutaway in FIGS. 3 and 4), which is internally screw threaded to engage with screw thread 16. The outer wall of the skirt 14 has upper 18 and lower 19 abutment surfaces to retain the collar 17 on the skirt and to allow the collar 17 to hold the reservoir 2 against the pump head when the respective screw threads engage. The upper end 15 of the reservoir 2 is profiled to abut against an internal abutment surface around the inner wall of the skirt 14 to provide an end stop and a toothpaste-tight seal.

Extending upwardly from the lower edge of the skirt 14 are two concavities in the form of cut-outs 20, disposed 180° apart around the circumference of the skirt 14. On the shaped upper part 15 of the reservoir 2 are two correspondingly shaped and positioned convexities 21. The position of the concavities 20 and convexities 21 permit the upper end 15 to be inserted into the skirt 14 in only two pre-set configurations disposed 180° apart. Once inserted the engagement of the concavities 20 and convexities 21, as shown in detail in FIG. 5 prevents the reservoir and pump head from rotating relative to each other about the longitudinal axis of the reservoir 2, and the collar 17 can be screwed tight. Within the concavity 20 the convexity 21 fits flush with the surface of the skirt 14 so as not to interfere with the operation of the collar 17.

In reservoir 2 the segments 3A, 3B are disposed in set positions relative to the convexities 21, achieved by the use of alignment means, of a generally known type when the reservoir 2 is initially filled by the manufacturer.

In use the dispenser may be supplied including a pump head 1 and a reservoir 2 full of toothpaste 3 attached together. The pump may be operated as described above until the reservoir 2 is empty. The collar 17 may then be unscrewed from thread 16, the empty reservoir 2 disposed of and a new reservoir 2 attached in its place. The engagement of concavities 20 and convexities 21 ensures that the segments 3A and 3B of the toothpaste in the reservoir 2 is aligned with the corresponding segments of residual toothpaste in the pump head 1 so that the striped appearance is not disrupted. The follower piston 12 may then be displaced upwards by hand pressure to displace toothpaste material in the new reservoir into the pump head 1 to a distance sufficient for the pump piston to operate in pumping toothpaste material out through channel 7.

Figure 7:
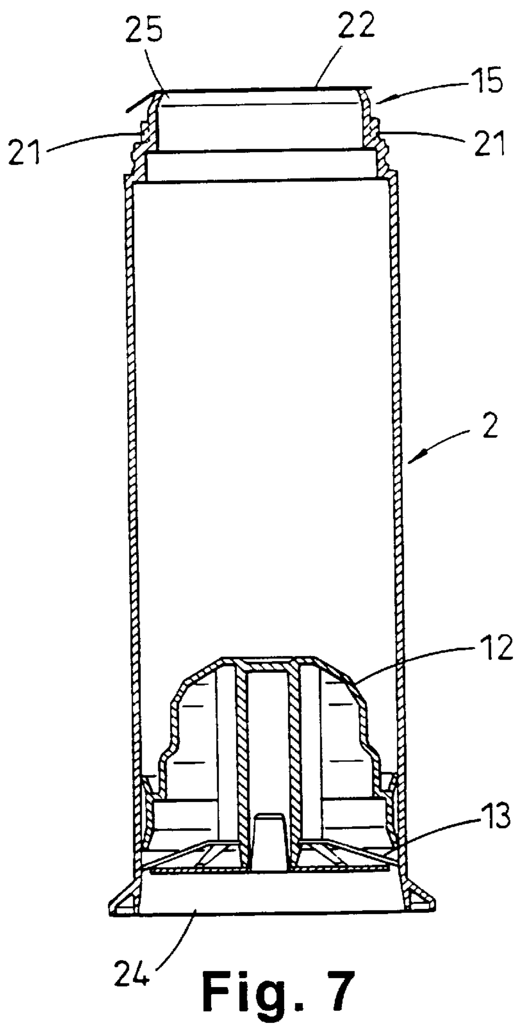
FIGS. 7 and 8 show two types of closure for the reservoir of FIGS. 1 to 6.
Figure 8:
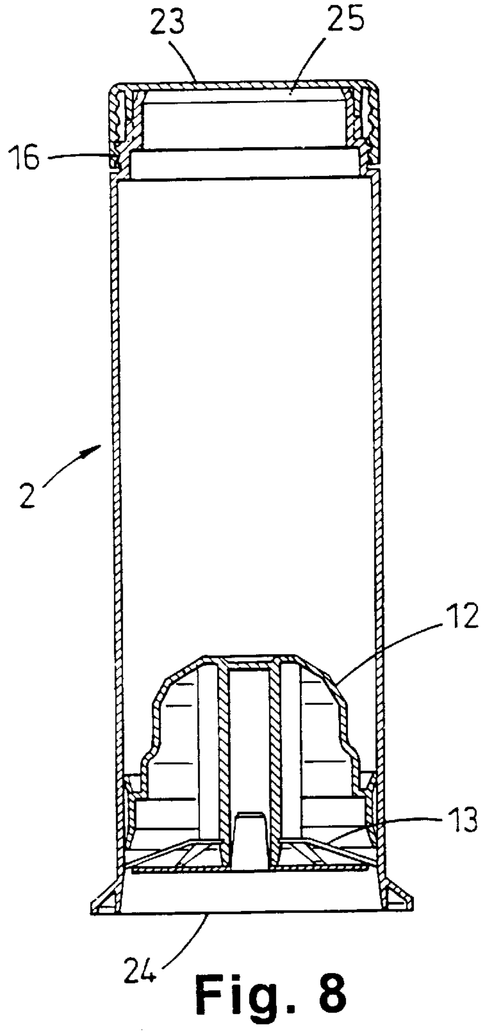

Referring to FIGS. 7 and 8, reservoirs 2 are shown respectively having the mouth at their upper end closed with a tear off foil seal 22, and a screw cap 23 engaging with the screw thread 16. Such a seal and closure can be easily removed just prior to attachment of the reservoir 2 to the pump head 1. The base 24 of the reservoir 2 is flat and the reservoir 2 or the entire dispenser can be stood on this base.

The reservoir 2 is normally filled from its open base end before the follower piston 12 is inserted, and the base 24 may include an alignment notch or projection with which a filling machine of known type may engage to ensure that the reservoir 2 is filled with the segments 3A, 3B, 3C correctly aligned with the convexity 21.

In an alternative construction (not shown) the upper surface of the follower piston 12 is made with a substantially flat upper surface shaped and dimensioned so that when the follower piston 12 is at its extreme upper position as shown in FIG. 2, the upper surface of the follower piston 12 is substantially co-planar with the rim 25 of the open upper part of the reservoir 2. When such a follower piston 12 is used, the top of the follower piston does not mate flush with the pump piston 4, but leaves a plug of toothpaste in the pump head 1. This plug can merge with the upper surface of toothpaste material in a new, full replacement reservoir 2 to provide a continuity of flow of toothpaste material.

What is claimed is:

1. A pump dispenser for a viscous flowable fluid material comprising a pump head, having at its lower end an attachment means for the fluid-tight replacable attachment of a replacable reservoir of the fluid material, the pump head having a mechanical hand-operable pump by means of which the material may be pumped from the reservoir to a dispensing orifice at the end of a nozzle;

a replacable reservoir of the fluid material replacably attached at the lower end of the pump head by means of the attachment means, the reservoir having a bottom which when the reservoir is attached to the pump head is distal to the pump head and having an upper end which when the reservoir is attached to the pump head is proximal to the pump head, with a longitudinal axis between the upper end and bottom;

characterized in that the reservoir contains adjacent segments of differently colored toothpaste material said segments being in contact with each other so as to produce toothpaste of a striped appearance on dispensing and the reservoir can be attached to the pump head only in one or more pre-set orientations relative to the pump head and further wherein, the lower end of the pump head comprises a skirt, and the upper end of the reservoir is a shaped end of the shape and size which can mate smoothly with a fluid tight fit with the skirt in a male-female type cooperation when the reservoir and skirt are presented to each other in the longitudinal axis direction of the reservoir, so that the reservoir cannot rotate about the longitudinal axis relative to the pump head.

2. A pump dispenser according to claim 1, characterized in that the orientation of the reservoir is locked so that the reservoir cannot significantly rotate relative to the pump head within 5°.

3. A pump dispenser according to claim 1 characterized in that below the shaped end the outer surface of the wall of the reservoir is screw threaded, and there is a correspondingly screw threaded retaining collar around the skirt which may engage the screw thread on the reservoir so as to hold the reservoir and pump head together.

4. A pump dispenser according to claim 1, characterized in that the outer surface of the wall of the skirt is provided with upper and lower abutment surfaces to prevent the retaining collar from becoming detached from the pump head, and against which the collar may grip when the collar is screwed tight to hold the reservoir against the pump head.

5. A pump dispenser according to claim 1, characterized in that the shaped end and the skirt include abutment surfaces to limit the distance the shaped end fits into the skirt and to provide a fluid tight seal.

6. A pump dispenser according to claim 1, characterized in that the attachment means includes respective abutment parts on the pump head and reservoir which abut and prevent attachment other than when the reservoir and pump head are presented to each other in a pre-set orientation, and when attached the abutment prevents relative rotation.

7. A pump dispenser according to claim 1 characterized in that the skirt has one or more concavities extending upwardly from its lower edge, and the shaped part of the reservoir which fits into the skirt has one or more correspondingly positioned convexities which engage with the concavities.

8. A pump dispenser according to claim 1 characterized in that the upper end of the reservoir comprises a skirt, the lower end of the pump head is a shaped end of shape and size which can mate smoothly with a fluid tight fit with the skirt in a male-female type cooperation when the reservoir and skirt are presented to each other in the longitudinal axis direction of the reservoir.

9. A pump dispenser according to claim 8 characterized in that the skirt has one or more concavities extending downwardly from its upper edge, and the shaped part of the reservoir which fits into the skirt has one or more correspondingly shaped and sized convexities which engage with the concavities.

10. A pump dispenser according to claim 1 characterized in that the parts of the reservoir and the pump head which attach together, are shaped in a way that only allows attachment together in one or more pre-set orientations and which prevents rotation when attached.

11. A pump head which can be attached to a replaceable reservoir of a fluid material to form a dispenser according to claim 1.

12. A replacable reservoir which can be attached to a pump head to form a dispenser as claimed in claim 1.

13. A dispenser according to claim 1 characterized in that the reservoir contains a toothpaste which is loaded into the reservoir in a number of radially disposed differently colored side-by-side segments.

14. A replacable reservoir for a dispenser according to claim 1 which contains a toothpaste which is loaded into the reservoir in a number of radially disposed differently colored side-by-side segments.

* * * * *